(12) United States Patent
Pruett

(10) Patent No.: US 6,755,916 B1
(45) Date of Patent: Jun. 29, 2004

(54) METHOD OF DISPENSING INHIBITOR IN A GAS PIPELINE

(75) Inventor: Rick D. Pruett, Kellyville, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 10/172,691

(22) Filed: Jun. 14, 2002

(51) Int. Cl.⁷ .................................................. B08B 9/04
(52) U.S. Cl. ..................................... 134/8; 15/104.061
(58) Field of Search ...................... 134/8, 22.11, 22.12, 134/23; 15/3.5, 104.061; 118/105, 408, 254, DIG. 10

(56) References Cited

U.S. PATENT DOCUMENTS

| | | | | |
|---|---|---|---|---|
| 2,707,934 A | | 5/1955 | Curtis | 118/408 |
| 3,111,431 A | | 11/1963 | Weaver | 118/105 |
| 3,600,736 A | * | 8/1971 | Smith et al. | 15/104.061 |
| 3,643,280 A | | 2/1972 | Powers | 15/104.06 |
| 3,708,819 A | * | 1/1973 | Breston | 15/104.061 |
| 4,411,039 A | * | 10/1983 | Timmins et al. | 15/104.061 |
| 4,774,905 A | | 10/1988 | Nobis | 118/304 |
| 5,699,577 A | * | 12/1997 | Rankin | 15/104.061 |
| 5,795,402 A | | 8/1998 | Hargett, Sr. et al. | 134/8 |
| 6,138,697 A | | 10/2000 | Horger et al. | 134/167 |
| 6,263,534 B1 | | 7/2001 | McCann et al. | 15/3.5 |
| 6,370,721 B1 | * | 4/2002 | Torres, Jr. et al. | 15/104.061 |

* cited by examiner

*Primary Examiner*—Alexander Markoff
*Assistant Examiner*—Saeed T Chaudhry
(74) *Attorney, Agent, or Firm*—Paul H. Johnson; Gable & Gotwals

(57) ABSTRACT

A method of distributing liquid present in the lower portion of a gas pipeline to the interior upper surface of the pipeline including the steps of passing a pig having a venturi therein, through the pipeline, the venturi being actuated by gas pressure taken from within the pipeline, the pig being asymmetrically weighted providing a pig upper portion and a pig lower portion, siphoning liquid from a lower interior portion of the pipeline through the venturi, storing liquid drawn from a lower portion of the pipeline in a reservoir carried by the pig, distributing siphoned liquid from the reservoir onto the pipeline upper interior surface and wherein the gas pressure is taken from a rearward portion of the pig.

3 Claims, 4 Drawing Sheets

US 6,755,916 B1

METHOD OF DISPENSING INHIBITOR IN A GAS PIPELINE

REFERENCE TO PENDING APPLICATIONS

This application is not based upon any pending domestic or international patent applications.

REFERENCE TO MICROFICHE APPENDIX

This application is not referenced in any microfiche appendix.

FIELD OF THE INVENTION

The invention described herein is a method of dispensing inhibitor in a gas pipeline in which a pig is moved through the interior of a pipeline by the flow of pressurized gas and distributes treating liquids, such as inhibitors, subsisting in the lower portions of the pipeline.

BACKGROUND OF THE INVENTION

The invention described herein is a pipeline pig that provides a method of applying a treating fluid, such as an inhibitor, within a pipeline to specific longitudinal areas along the inner wall of the pipeline and particularly to the upper interior portions of the interior wall of a pipeline.

Pipelines, particularly those designed to carry large volumes of gas under pressure, are customarily made of metal and usually of steel. Steel is the preferred metal for construction of a pipeline due to its inherent strength, availability and economy. However, steel is subject to corrosion as a consequence of oxidation or reaction with gasses or liquids, such as water, that is commonly encountered when large volumes of gas are delivered through a pipeline. To combat corrosion a standard technique employed by many operators of pipelines is to periodically deposit inhibitor liquid within the pipeline. The liquid can be moved by the flow of gas through the pipeline or more commonly, by the use of pipeline pigs inserted into the pipeline that are moved by the flow of gas, the pigs serving to provide a moving plunger within the pipeline that tends to sweep liquid within the pipeline before it and to therefore move the liquid through the full length of the pipeline.

One method of applying a treating liquid to the interior of a pipeline is called "batching" in which treating liquid is captured between two pipeline pigs that move in tandem through a pipeline pig with the treating liquid therebetween. Although this method is widely accepted and used it does not insure that the upper quadrant of the interior of a pipeline is adequately coated with or exposed to the treating liquid.

A second method of treating the interior cylindrical surface of a pipeline is called the "injection method." In this method, the treating liquid is injected directly into the pipeline and is moved by gas flow to carry the liquid through the length of the pipeline. This method is costly and usually requires that treating liquids be more or less continuously injected into the pipeline. There is no direct application, in this method, of the treating liquid to the inner wall since liquid simply rests on the bottom interior surface of the pipeline as it moves along the length of the pipeline.

To combat these problems, the pipeline pig of this invention provides a method of distributing liquid present in the lower portion of a pipeline to the interior upper quadrant of the pipeline interior as the pig passes by the flow of gas through the length of the pipeline.

For background information relating to pipeline pigs that have similar uses and applications reference may be had to the following previously issued United States patents and a U.S. patent application publication:

| Patent Number | Inventor(s) | Title |
| --- | --- | --- |
| 2,707,934 | Curtis | Pipeline Treating Plug |
| 3,111,431 | Weaver | Interior Pipe Coating Device |
| 3,643,280 | Powers | Pipeline Pigs |
| 4,411,039 | Timmins, et al. | Removal of Condensed Gas from the Walls of Gas Pipelines |
| 4,774,905 | Nobis | Apparatus for Internally Coating Pipes |
| 5,795,402 | Hargett, Sr. et al. | Apparatus and Method for Removal of Paraffin Deposits in Pipeline Systems |
| 6,138,697 | Horger, et al. | Hydrodynamic Apparatus for Cleaning Channels and for Monitoring Channels |
| 6,263,534 | McCann, et al. | Delivery Device |
| US2001/0017147 | Gazewood | Method for Jetting a Fluid |

BRIEF SUMMARY OF THE INVENTION

The invention herein is a pipeline pig that is moved through the interior of a pipeline by the flow of pressurized gas and that provides for improved distribution of treating liquid, such as an inhibitor, subsisting in the lower portion of the pipeline. The pipeline pig has a longitudinal pig body having a forward end and a rearward end. Forward and rearward centralizers are affixed to the pig body by which it is supported centrally in the pipeline and by which it is moved by gas flow through the pipeline. These centralizers are preferably in the form of elastameric cups or disks, each having an external circumferential surface that closely conforms to the internal circumferential surface of the pipeline.

A bypass passageway is provided through the pig body that communicates with the pipeline interior rearward end. A separate siphon passageway, communicates with a lower portion of the pipeline interior, the siphon passageway being preferably positioned adjacent the front end of the pig body.

A venturi is supported by the pig body in communication with the siphon passage and with the bypass passageway. A flow of gas through the bypass passageway serves to draw liquid through the siphon passageway and, employing the Bernoulli effect, the liquid from the siphon passageway is discharged onto an upper portion or upper portions of the interior pipeline wall. In this way, as the pipeline pig is moved through the interior of a pipeline, liquid is moved by the application of Bernoulli's law to be sprayed onto the upper interior portion of the pipeline.

The method of distributing liquid present in the lower portion of a gas pipeline to the interior upper surface of the pipeline includes the steps of passing a pig having a venturi therein that is activated by gas pressure taken from a rearward end portion of the pig siphoning liquid from the lower interior portion of the pipeline by venturi action, and distributing the siphon liquid to the pipeline upper interior surface.

A better and more complete understanding of the invention will be obtained from the following description of the preferred embodiments, and the claims, taken in conjunction with the attached drawings.

BRIEF DESCRIPTION OF THE DRAWINGS

FIG. 5 also shows a secondary channel that draws fluid from the forward reservoir for ejection by the spray nozzle.

DETAILED DESCRIPTION OF THE PREFERRED EMBODIMENTS

It is understood that the invention herein is not limited to the details of construction and arrangement of parts illustrated in the accompanying drawings. The invention is capable of other embodiments and of being practiced or carried out in a variety of ways. The phraseology and terminology employed herein are for the purpose of description and not limitation.

Figure 2:
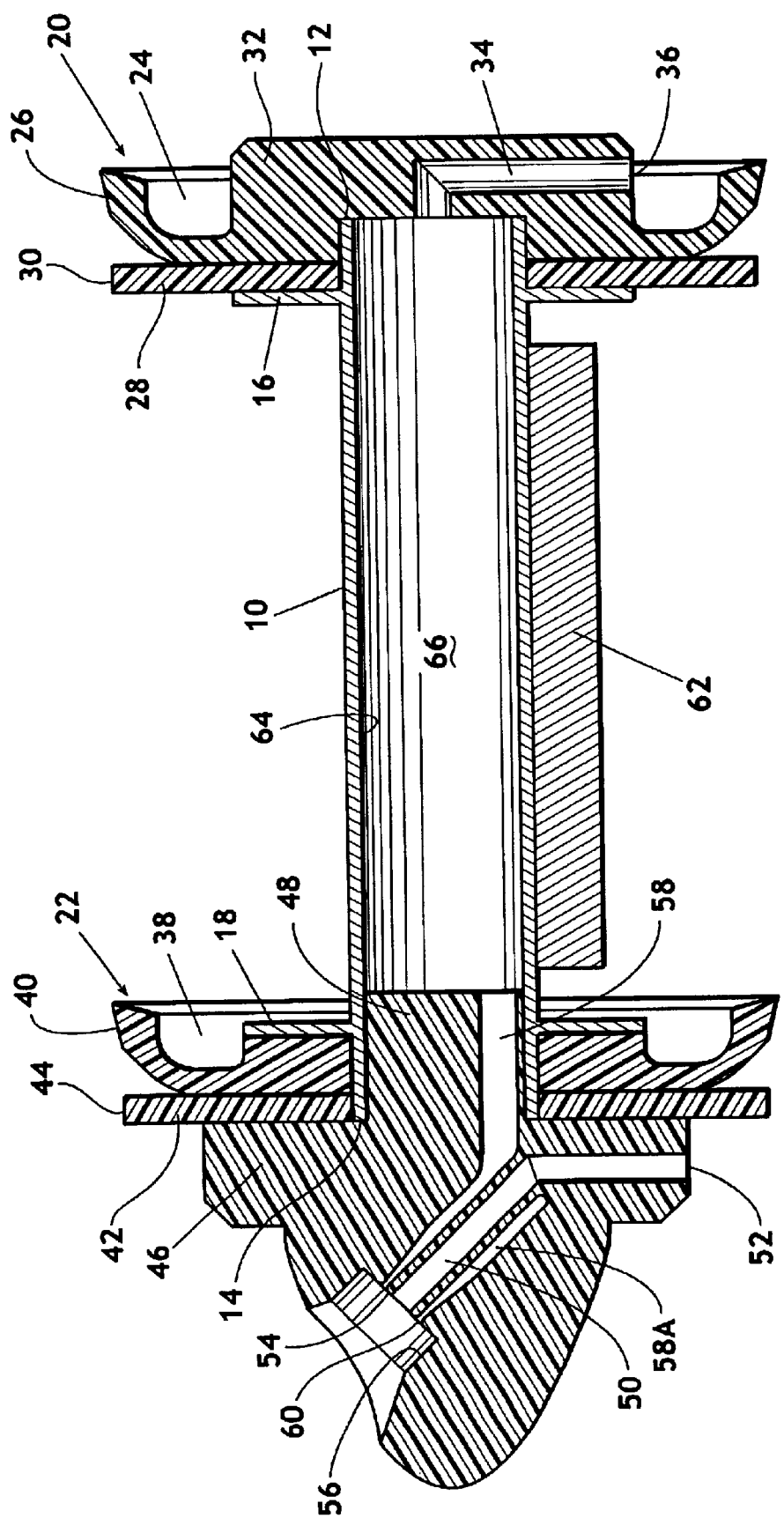
FIG. 2 is an elevational cross-sectional view of a pipeline pig as in FIG. 1 but in the embodiment wherein only a body reservoir is employed.
Figure 3:
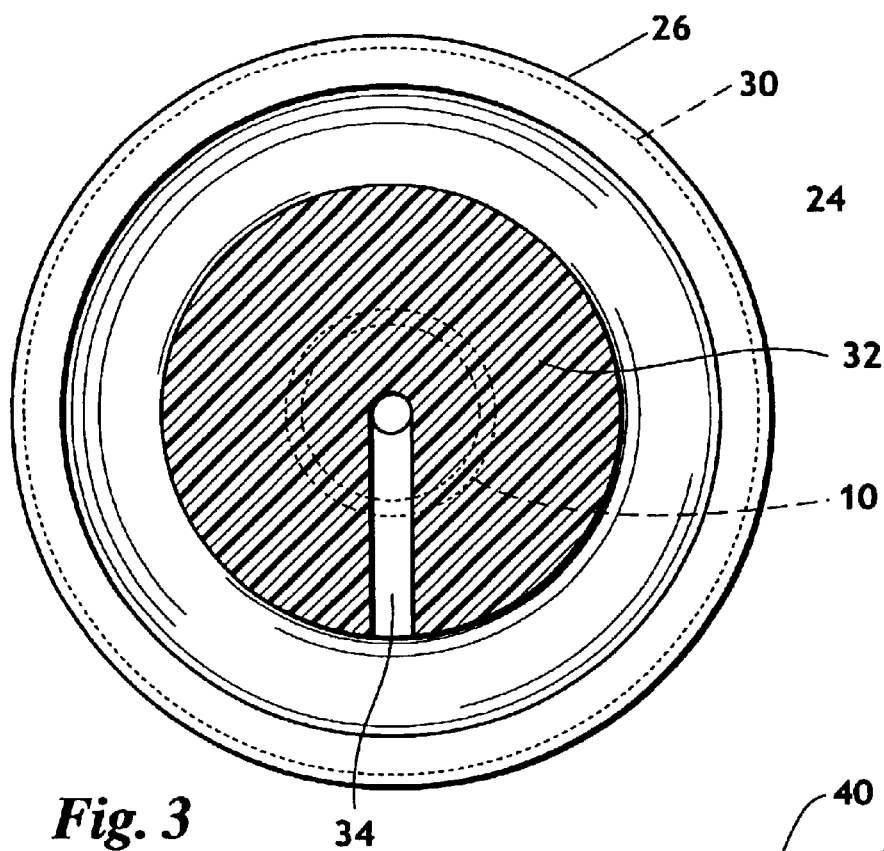
FIG. 3 is a cross-sectional view taken along the line 3—3 of FIG. 1. This view is taken through a portion of the rearward cup of the pipeline pig and shows the passageway for bypass gas flow to enter the rearward end of the pig body.
Figure 4:
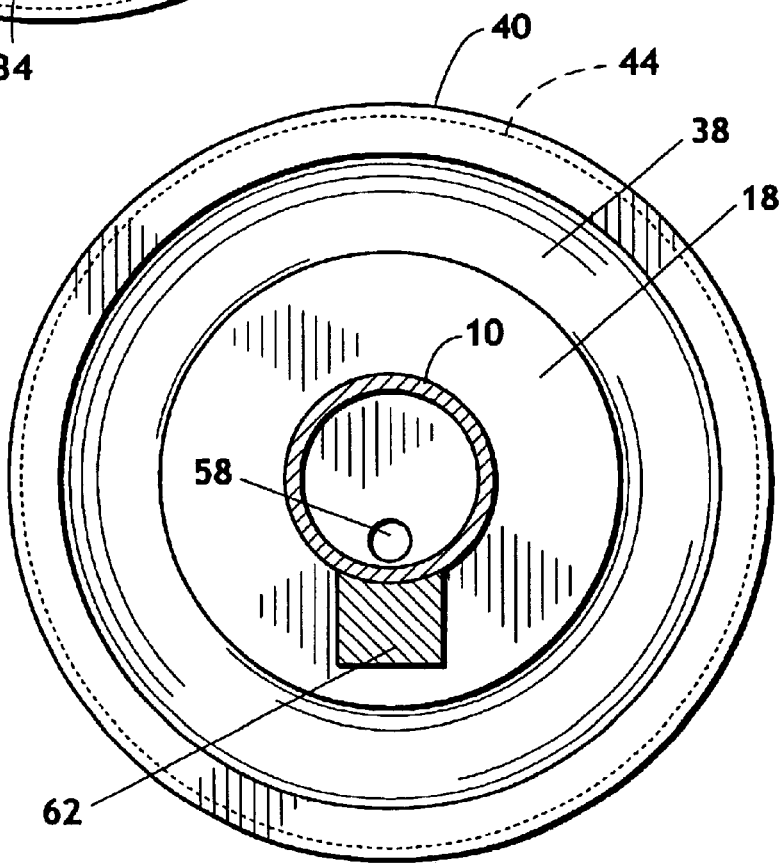
FIG. 4 is an elevational cross-sectional view taken along the line 4—4 of FIG. 1 showing the midsection of the pipeline pig body.
Figure 5:
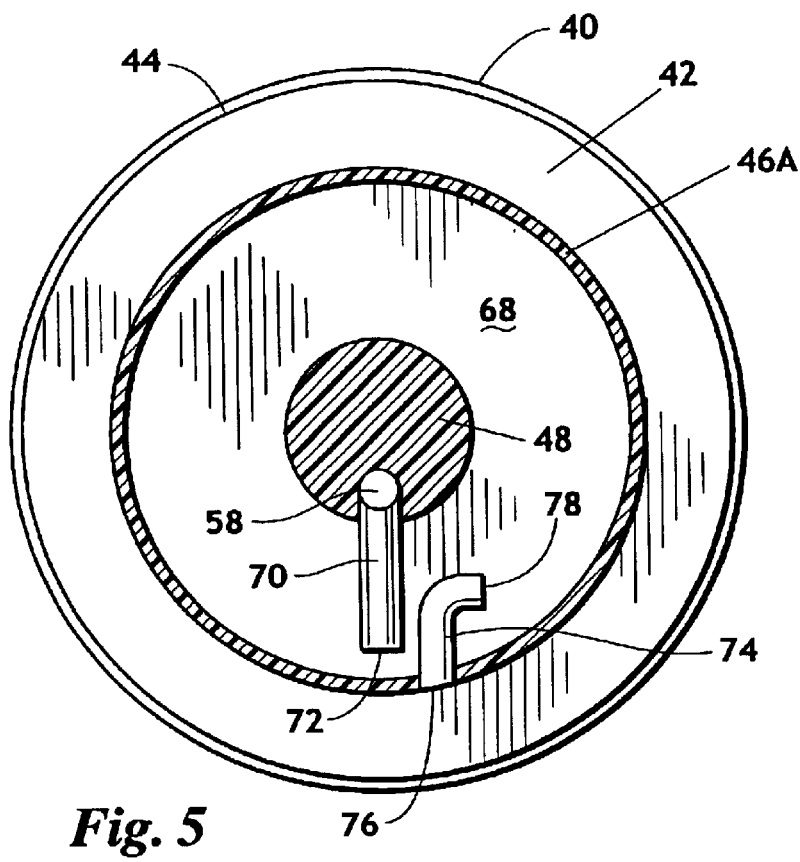
FIG. 5 is an elevational cross-sectional view taken along the line 5—5 of FIG. 1 showing a cross-sectional view of a portion of the nose cone and of the area that forms the forward reservoir.
Figure 6:
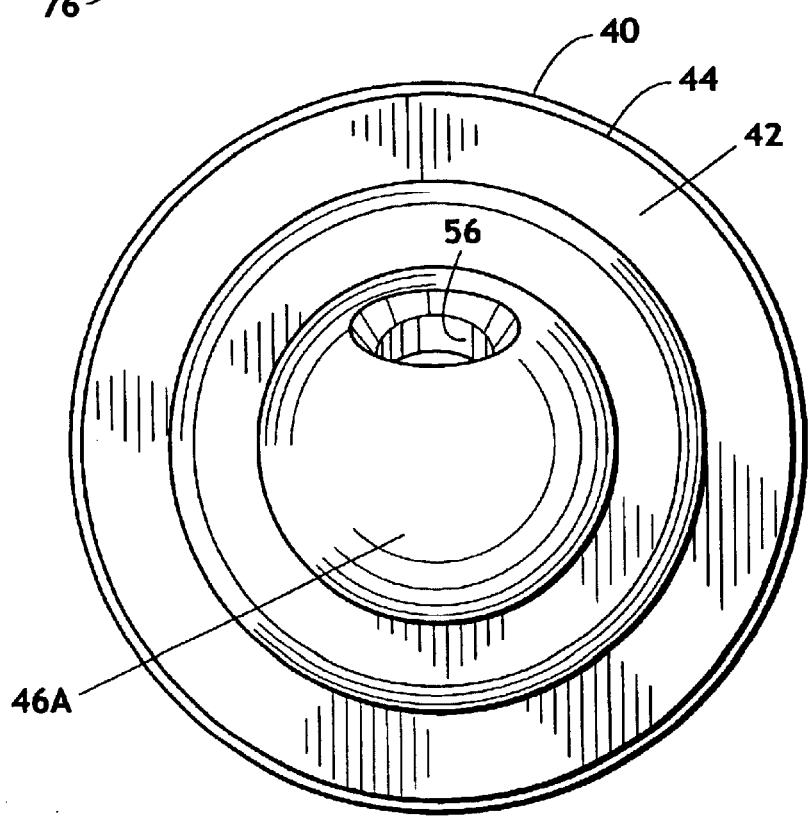
FIG. 6 is an elevational front view of the pipeline pig as taken along the line 6—6 of FIG. 1 showing the nose cone and the spray nozzle in the nose cone through which liquid is ejected by bypass gas flow.

The first embodiment to be described is the simpler of the two illustrated embodiments—that is, it employs only a single body fluid cavity and is illustrated in elevational cross-sectional view in FIG. 2. The cross-sectional views of FIGS. 3, 4 and 6 are applicable to the embodiment of FIG. 2. The pipeline pig of FIG. 2 includes a longitudinal cylindrical body 10 that is preferably made of a rigid material, such as of a metal pipe. Body 10 has a rearward end 12 and a forward end 14. Radially extending from adjacent the rearward end 12 is a rearward flange 16 and a substantially identical forward flange 18 extends from the exterior cylindrical surface of body 10 adjacent to forward end 14. Positioned at the pig body rearward end 12 is a rearward cup generally indicated by the numeral 20 and in like manner positioned adjacent the body forward end 14 is a forward cup generally indicated by the numeral 22. Cups 20 and 22 are preferably made of elastameric material, such as a tough plastic or rubber. Urethane is a commonly used material for pipeline pig cups. Rearward cup 20 has a circumferential cup shaped recess 24 in the rearward surface that provides a flexible circumferential lip portion 26. Cup 20 is configured such that the force of gas flow through a pipeline pushing on the rearward end of the cup will tend to expand the circumferential lip portion 26 into sealing engagement with the pipeline interior cylindrical surface (not shown) so that the pig is moved by fluid flow through the pipeline.

Positioned between rearward cup 20 and rearward flange 16 is a rearward radial disk 28 that is also preferably made of tough elastameric material. Disk 28 has an outer circumferential edge 30 that engages the interior wall of a pipeline and serves in a squeegee action to move any fluid in the pipeline with the pig as it is forced through the pipeline by gas flow.

Rearward cup 20 has a thick inner body portion 32 having formed therein a rearward inlet passageway 34 that communicates at one end with the interior of pig body 10 and at the inlet end 36 with the lower interior of a pipeline (not shown) in which the pig passes. The function of inlet passageway 34 is to permit gas to pass therethrough and to carry with it any fluid captured by the gas flow from the lower interior of a pipeline.

Forward cup 22 is configured similar to rearward cup 20 and has a cup-shaped recess 38 that provides a circumferential forward cup lip portion 40 that is expanded outwardly by the force of gas flow to engage the interior of a pipeline in which the pig passes so that the pig is moved through the pipeline. Further, forward of and adjacent to forward cup 22 is a forward radial disk 42 that has a circumferential peripheral edge 44 that engages the interior wall of a pipeline. Disk 42 serves to move fluid in advance of the pipeline pig as it moves through a pipeline.

Secured to the front of pig body 10 is a nose cone 46 that is preferably formed of elastameric material and has a central reduced diameter cylindrical portion 48 received in the forward end 14 of pig body 10 by which the nose cone is secured to the pig body. A radially extended portion of the nose cone serves to capture and hold in place forward radial disk 42.

Formed in the nose cone is a siphon passage 50 having an inlet end 52 in communication with the lower interior of a pipeline (not shown) in which the pig moves. The opposite end 54 of siphon passageway 50 is an outlet end that communicates with a nozzle opening 56 formed in the nose cone.

Formed in nose cone 46 is a gas bypass passageway 58 having a forward portion 58A that surrounds siphon passageway 50. This arrangement provides an annular gas passageway exit 60 at the outer end 54 of siphon passageway 50.

Since the pipeline pig described up to this point is essentially symmetrical around an axis of pig body 10 and since it is important that fluid that is distributed by the pipeline pig is oriented in an upward direction to impinge upon an upper interior quadrant of the pipeline interior circumferential wall, it is important that the nozzle opening 56 be oriented upwardly. For this reason there is affixed to pig body 10 a counterweight 62 that is preferably made of metal or is otherwise heavy so that the pig body will not rotate as it moves through a pipeline but will maintain an axial orientation relative to gravitational force to axially point the nozzle opening 56 in an upwardly inclined orientation.

The method of operation of the embodiment of FIGS. 2, 3, 4 and 6 will now be described. When the pipeline pig is positioned in a pipeline that has treating fluid, such as a rust inhibitor or corrosion inhibitor liquid therein, the pig is moved by gas flow through the pipeline. As it moves through the pipeline the pig, and particularly radial disks 28 and 42, are configured to move liquid forward in advance of the pig so that the liquid will be carried from one area to another within the pipeline. As the pig moves through a pipeline and pushes liquid along ahead of it, some of the pressurized gas from the rearward end of the pipeline pig flows through rearward inlet 34, through interior 64 of pig body 10 and out through bypass passageway 58 and 58A. This gas flow surrounds siphon passageway 50 and draws liquid within the lower interior portion of the pipeline into inlet end 52 of siphon passageway 50. This is the application of what is commonly referred to as the Bernoulli principle. The Bernoulli principle states a relationship between internal fluid pressure and fluid velocity, essentially a statement of the conservation of energy that has, as a consequence, the application of a reduced pressure at the outer end 54 of siphon passageway 50 to thereby draw liquid from within this siphon passageway and carry it with the gas passing outwardly through annular gas passageway exit 60 so that a spray of liquid is formed that is ejected from nozzle opening 56 to cover an upper interior segment of the pipeline interior cylindrical wall (not shown).

The inlet 36 of rearward passageway 34 is preferably placed, as illustrated in FIGS. 2 and 3, close to the interior bottom of a pipeline through which the pig moves so that any liquid within the pipeline, rearwardly of rear cup 20, tends to be drawn in by gas flow. This liquid collects within the interior 64 of body. 10 so that the interior body forms a reservoir 66 that carries liquid with it. Reservoir 66 functions as a source of liquid that is available in the event the pipeline pig passes an area that it is otherwise void of liquid. Thus the provision of an interior reservoir within the body of the pipeline pig helps insure more consistent and even distribution of treating liquid to the upper interior portion of a pipeline interior wall.

Figure 1:
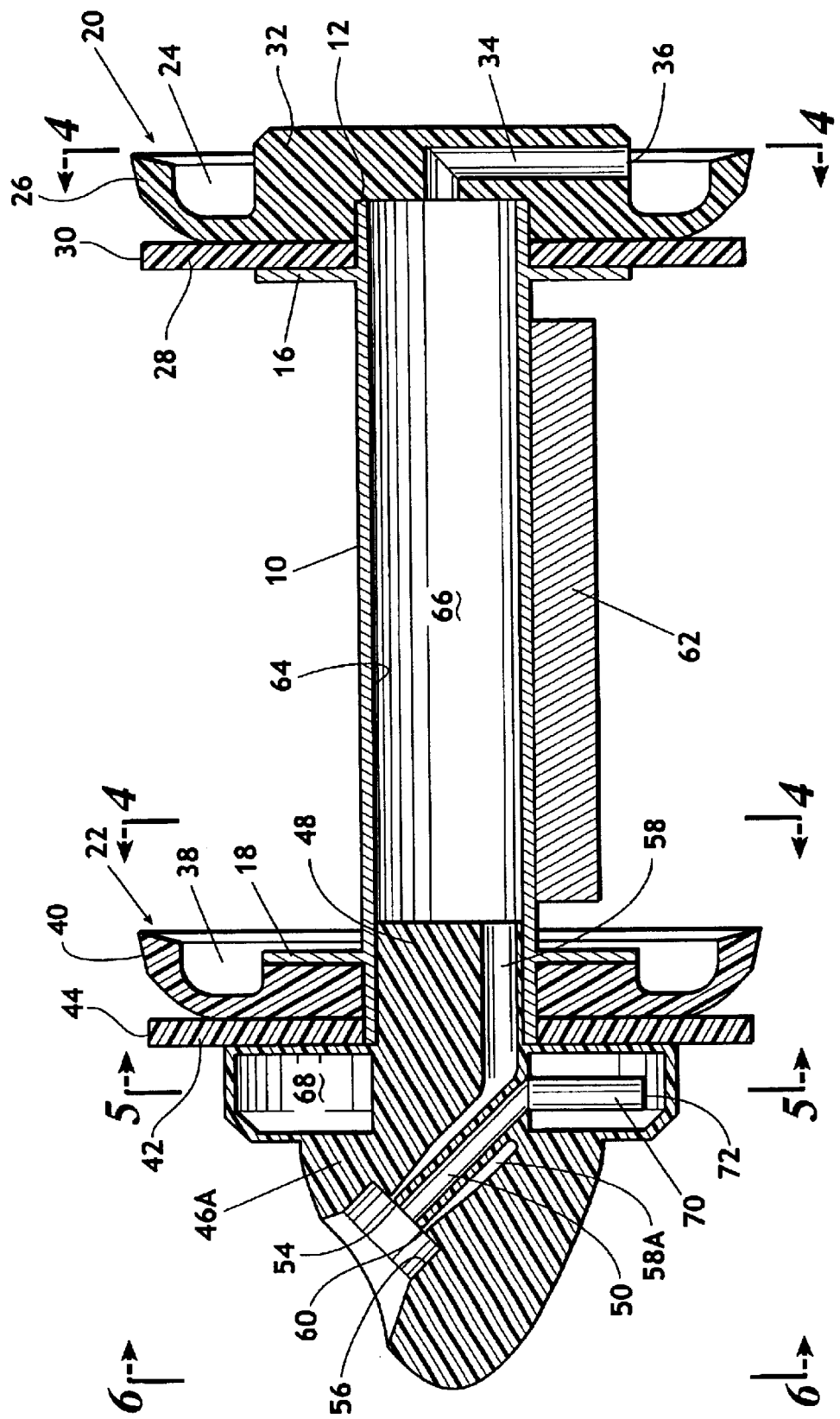
FIG. 1 is an elevational cross-sectional view of a pipeline pig that encompasses the principles of this disclosure. The pipeline pig of FIG. 1 has a first fluid reservoir within the interior of the pig body and a second, forward reservoir in the nose cone portion of the pig for purposes that will be described in detail subsequently.

FIG. 1 taken in conjunction with the cross-sectional views of FIGS. 3 through 6, shows an alternate embodiment of the invention in which the same or equivalent elements have the same numbers as in FIG. 2 but in all respects the arrangement of FIG. 1 is the same as FIG. 2 except that FIG. 1 provides, in addition to the first reservoir 66 within the confines of body 10, a second reservoir 68 that is formed within the interior of a nose cone 46A. Nose cone 46A is essentially identical to nose cone 46 of FIG. 2 except for the provision of the second reservoir area 68. Further, the siphon passageway 50 includes a siphon tube 70 that has an open lower end 72 that communicates with second reservoir 68 formed in the nose cone.

An additional element in FIG. 1 compared to FIG. 2, is an inlet tube 74 positioned within second reservoir 68. Inlet tube 74 has an inlet end 76 (see FIG. 5) that extends through the outer circumferential wall of the nose cone that forms second reservoir 68, and an outlet end 78 that communicates with second reservoir 68.

OPERATION OF THE EMBODIMENT OF FIGS. 1 THROUGH 6

The liquid distribution pig of FIG. 1 compared to that of FIG. 2 functions in substantially the same way except that the liquid to be distributed on the interior surface of a pipeline through which the pig passes is primarily drawn from second reservoir 68 by the Bernoulli action of gas flowing through the forward portion 58A of bypass passageway 58 and out the annular gas passageway 60, drawing fluid from within second reservoir 68. Liquid is forced into second reservoir 68 by the build up of liquid in front of forward radial disk 42. As liquid is drawn by the Bernoulli action from second reservoir 66, reduced pressure in the reservoir is created that draws fluid upwardly through fluid inlet 74 (seen in FIG. 5).

The advantage of the embodiment FIG. 1 compared to that of FIG. 2 is that a second reservoir is added within the pig so that if areas of a pipeline are encountered wherein no residual liquid treating resides in a lower portion of the pipeline there is more likelihood that the interior of the pipeline will be covered by the spray of protective liquid taken from either first reservoir 66 or second reservoir 68.

The invention is illustrated and described with a single siphon spray however it is easy to see that more than one such siphon spray may be arranged in the nose cone if desired.

The invention that has been described wherein the pig (whether the embodiment of FIG. 1 or FIG. 2) is operated by itself within a pipeline. Another method of operation of the pipeline pig described herein is to run the pig in tandem with a following second pipeline pig so that the second pipeline pig functions more or less as a piston to force liquid from within the pipeline into the fluid dispensing pig to better distribute the liquid onto the interior wall of the pipeline.

Important features of this invention include the provision of an injection method in the form of a pipeline pig that can be inserted into a pipeline and driven by gas pressure so that bypass flow creates siphon action drawing liquid located in the bottom portion of a pipeline and ejecting the liquid through a spray nozzle directed to the upper area of the inner pipeline wall. When the pipeline pig of this invention is used as a front element of a two pig batching process, improved action may be achieved. Further, the nozzle of the pipeline pig of this invention may be positioned in any location around the front of the pig and a plurality of nozzles may be used so that thereby a complete 360° coating application of a protective fluid onto the internal cylindrical wall of a pipeline may be attained.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of distributing liquid present in the lower portion of a gas pipeline to upper interior surfaces of the pipeline, comprising:

passing a pig having a venturi therein through the pipeline, the venturi being actuated by gas pressure taken from within the pipeline, the pig being asymmetrically weighted providing a pig upper portion and a pig lower portion;

siphoning liquid from a lower interior portion of the pipeline through an inlet portion of said venturi that communicates with said pig lower portion;

storing liquid drawn from a lower portion of the pipeline in a reservoir carried by the said pig;

distributing siphoned liquid through an outlet portion of said venturi onto the pipeline upper interior surface; and wherein said gas pressure is taken from a rearward portion of the pig and is taken from a lower interior portion of the pipeline whereby liquid in the pipeline is, at least part of the time, taken into the pig and stored in said reservoir, liquid from the reservoir being distributed onto the pipeline upper interior surfaces.

2. A method according to claim 1 wherein said pig is asymmetrically weighted to provide a pig upper portion and a pig lower portion and wherein the siphoned liquid is distributed through an upwardly inclined passageway.

3. A method according to claim 1 wherein said pig has a passageway therein connected between a rearward portion of said pig and said venturi, and herein said passageway has an inlet that communicates with lower interior portion of the pipeline.

* * * * *